(12) United States Patent
Lee et al.

(10) Patent No.: US 9,122,308 B2
(45) Date of Patent: Sep. 1, 2015

(54) TACTILE FEEDBACK APPARATUS, SYSTEM, AND METHOD OF OPERATING TACTILE FEEDBACK APPARATUS

(75) Inventors: Hyung Kew Lee, Gunpo-si (KR); Joon Ah Park, Seoul (KR); Soo Chul Lim, Seoul (KR); Seung Ju Han, Seoul (KR); Bho Ram Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 13/587,573

(22) Filed: Aug. 16, 2012

(65) Prior Publication Data

US 2013/0069863 A1 Mar. 21, 2013

(30) Foreign Application Priority Data

Sep. 20, 2011 (KR) ........................ 10-2011-0094501

(51) Int. Cl.
*G06F 3/01* (2006.01)

(52) U.S. Cl.
CPC ................. *G06F 3/016* (2013.01); *G06F 3/011* (2013.01)

(58) Field of Classification Search
CPC ............ G06F 3/01; G06F 3/011; G06F 3/016
USPC ................................................ 345/156–169
See application file for complete search history.

(56) References Cited

U.S. PATENT DOCUMENTS

| | | | |
|---|---|---|---|
| 6,037,703 A | 3/2000 | Kambe et al. | |
| 6,636,197 B1* | 10/2003 | Goldenberg et al. | 345/156 |
| 7,480,600 B2 | 1/2009 | Massie et al. | |
| 7,679,611 B2 | 3/2010 | Schena | |
| 2001/0020200 A1* | 9/2001 | Das et al. | 700/260 |
| 2002/0033841 A1* | 3/2002 | Rosenberg | 345/701 |
| 2004/0135767 A1* | 7/2004 | Park | 345/156 |
| 2005/0179565 A1* | 8/2005 | Mase et al. | 341/21 |
| 2008/0248836 A1* | 10/2008 | Caine | 455/566 |
| 2009/0102620 A1 | 4/2009 | Kato et al. | |
| 2010/0226075 A1* | 9/2010 | Jahge | 361/679.01 |
| 2010/0264007 A1* | 10/2010 | Jung et al. | 200/516 |
| 2010/0292706 A1* | 11/2010 | Dutson et al. | 606/130 |

FOREIGN PATENT DOCUMENTS

| | | |
|---|---|---|
| EP | 1816545 A2 | 8/2007 |
| JP | 5-313810 | 11/1993 |
| JP | 2008-257297 | 10/2008 |
| JP | 2010-33560 | 2/2010 |
| KR | 10-2009-0004211 | 1/2009 |
| KR | 10-2010-0112780 | 10/2010 |
| WO | 2008/054856 A2 | 5/2008 |
| WO | 2011/075390 A1 | 6/2011 |

OTHER PUBLICATIONS

Extended European Search Report issued May 14, 2013 in corresponding European Application No. 12165746.4.

* cited by examiner

*Primary Examiner* — Dwayne Bost
*Assistant Examiner* — Stefan M Oehrlein
(74) *Attorney, Agent, or Firm* — NSIP Law

(57) ABSTRACT

A tactile feedback apparatus, system, and a method of operating the tactile feedback apparatus may detect a finger of a user touching a disk unit, determine a height at which the disk unit is supported, based on a signal generated by a sensor, and support a lower portion of the disk unit by controlling N driving units to be set at the determined height, thereby providing power sensed by the sensor to the finger of the user touching the disk unit.

10 Claims, 10 Drawing Sheets

TACTILE FEEDBACK APPARATUS, SYSTEM, AND METHOD OF OPERATING TACTILE FEEDBACK APPARATUS

CROSS-REFERENCE TO RELATED APPLICATIONS

This application claims the priority benefit of Korean Patent Application No. 10-2011-0094501, filed on Sep. 20, 2011, in the Korean Intellectual Property Office, the disclosure of which is incorporated herein by reference.

BACKGROUND

1. Field

Example embodiments of the following description relate to a technology that may enable intuitive recognition of power that is fed back from a finger of a user by feeding back sensed power.

2. Description of the Related Art

Research on a haptic feedback is actively being performed as a technology for feeling power, i.e., a tactile sense. The haptic feedback refers to artificially generating and transferring a sense that is felt when actually controlling an object on a hand or arm of a human in order to intuitively control, for example, an object in a virtual space or a robot at a far distance. As an example, a haptic feedback apparatus may provide a feedback in a manner of adjusting a level of a load that is felt while controlling a device, when a human controls an object in a virtual space or a robot at a far distance using a specially designed device, for example, a control stick.

Since a relatively great portion of a tactile sense is distributed in a finger, among body parts, a user controls an object with a finger in a sophisticated manner, and easily recognizes strength of a power required to control the object. Accordingly, in order to control an object in a sophisticated manner, using a robot, there is a desire for a technology that transfers, to a finger of a user, power applied to a finger of the robot or power applied to the object by the robot, and enables the user to recognize the power intuitively, thereby controlling power used to control the robot based on the recognized power.

SUMMARY

The foregoing and/or other aspects are achieved by providing a tactile feedback apparatus, including a disk unit that is touched by a finger of a user, N driving units to support a lower portion of the disk unit, and a control unit to determine a height at which the N driving units support the disk unit, based on a signal generated by a sensor, N being a natural number.

The N driving units may correspond to N pneumatic balloon driving units that support the disk unit, using air pressure. In this instance, the control unit may control, based on the signal, an amount of air that is provided to each of the N pneumatic balloon driving units.

Each of the N pneumatic balloon driving units may adjust a height at which the disk unit is supported at each of N radially symmetric points that are designated, based on the center of the disk unit, by supporting the disk unit using each respective air pressure corresponding to the amount of air provided, for each of the N radially symmetric points.

The N driving units may correspond to N motor driving units, each supporting the disk unit, using a drive shaft that moves in response to a pulse being applied. In this instance, the control unit may control, based on the signal, a strength of a pulse that is applied to each of the N motor driving units.

Each of the N motor driving units may adjust a height at which the disk unit is supported at each of the N radially symmetric points that are designated based on the center of the disk unit, by moving the drive shaft depending on the strength of the pulse applied, for each of the N radially symmetric points.

The tactile feedback apparatus may further include a disk restoring unit disposed between the disk unit and the N driving units to maintain a gradient of the disk unit formed according to the height at which the disk unit is supported, to remain within a predetermined range.

The tactile feedback apparatus may further include a guide member to fix an angle or a height at which the finger touches the disk unit.

The foregoing and/or other aspects are also achieved by providing a method of operating a tactile feedback apparatus, the method including detecting a finger of a user touching a disk unit, determining a height at which the disk unit is supported, based on a signal generated by a sensor, and supporting a lower portion of the disk unit by controlling N driving units to be set at the determined height.

The foregoing and/or other aspects are also achieved by providing a tactile feedback system, including a tactile feedback apparatus including a disk unit that is touched by a finger of a user, N driving units to support a lower portion of the disk unit, and a control unit to determine heights at which the N driving units support the disk unit, based on a signal generated by a sensor; and a robot to which the tactile feedback apparatus is applied.

The N driving units may correspond to N pneumatic balloon driving units that support the disk unit, using air pressure. In this instance, the control unit may control, based on the signal, an amount of air that is provided to each of the N pneumatic balloon driving units.

The N driving units may correspond to N motor driving units, each supporting the disk unit, using a drive shaft that moves in response to a pulse being applied. In this instance, the control unit may control, based on the signal, a strength of a pulse that is applied to each of the N motor driving units.

Each of the N motor driving units may adjust a height at which the disk unit is supported at each of the N radially symmetric points that are designated based on the center of the disk unit, by moving the drive shaft depending on the strength of the pulse applied, for each of the N radially symmetric points.

The example embodiments may include a tactile feedback apparatus that may adjust a height at which a disk unit is supported, based on a signal generated by a sensor, and may adjust a height, a direction of a gradient, or a level of a gradient of the disk unit, thereby recognizing power sensed by the sensor with a finger of a user touching the disk unit intuitively.

Accordingly, the tactile feedback apparatus may be applied to a robot, for example, a surgical robot, that controls a sensitive tissue, for example, a human body, or an object. The tactile feedback apparatus may transfer, to the user, power used to touch a tissue by an end part of the robot, and may enable the user to control power used to control the robot, in a sophisticated manner, based on the transferred power, thereby improving efficiency and safety in tasks that use robots.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
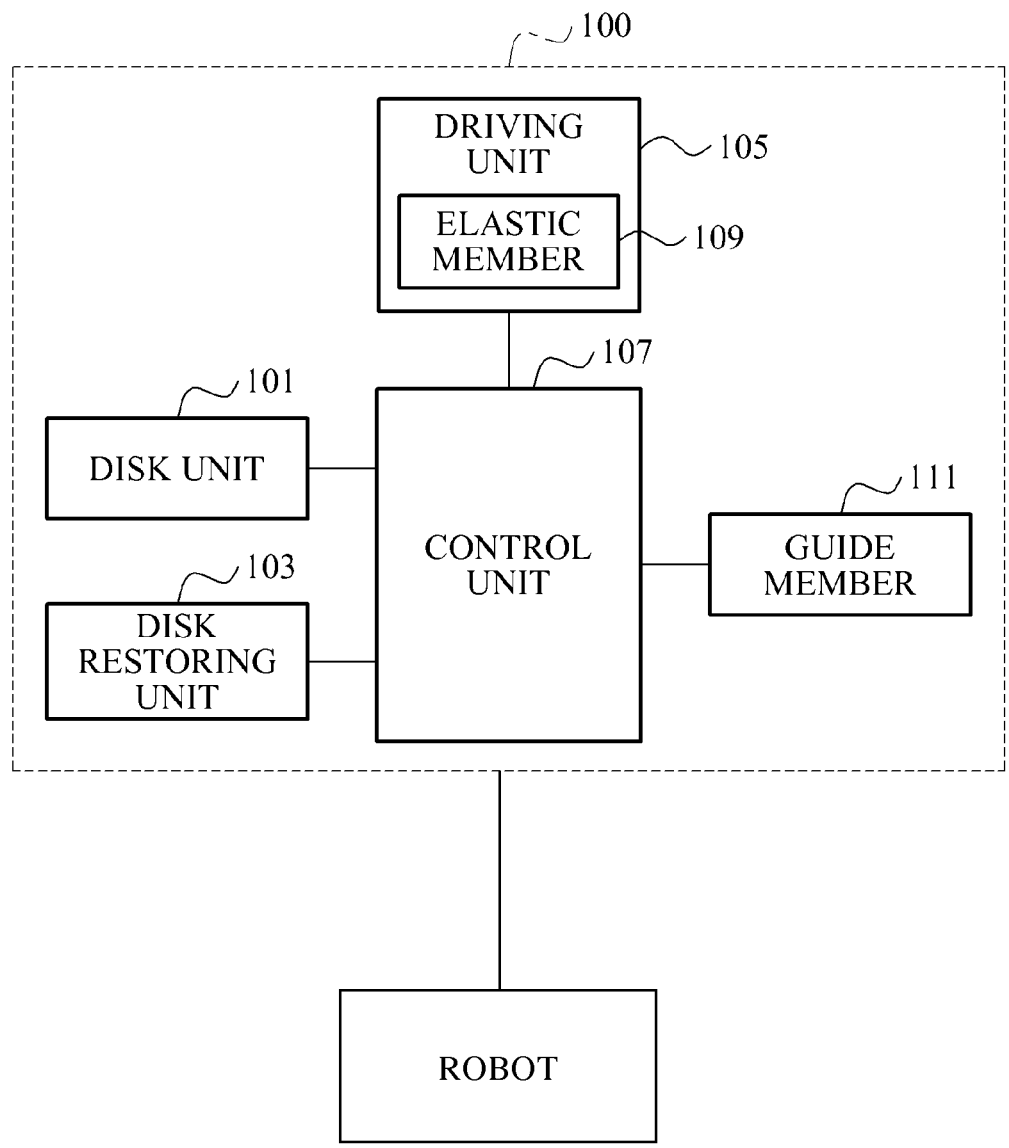
FIG. 1 illustrates a configuration of a tactile feedback apparatus, according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of a tactile feedback apparatus, according to example embodiments.

Referring to FIG. 1, a tactile feedback apparatus 100 may include a disk unit 101, a disk restoring unit 103, a driving unit 105 including an elastic member 109, and a control unit 107. The tactile feedback apparatus 100 may further include a guide member 111 to fix an angle or a height of the disk unit 101.

The disk unit 101 may correspond to a portion touched by a finger of a user, and may be disposed on an upper side of the tactile feedback apparatus 100, for example, in a form of a plate. The disk unit 101 may transfer power sensed by a sensor to the finger of the user by adjusting a height, a direction of a gradient, or a level of a gradient, based on a height adjusted by the driving unit 105, for each radially symmetric point. In this instance, since the disk unit 101 may be movable or rotatable in directions x, y, and z, a three degrees of freedom (3DOF) motion may be provided.

The disk unit 101 may form various patterns on a surface of the disk unit 101 in order to improve an effect of a tactile feedback to the finger touching the disk unit 101.

The disk restoring unit 103 may correspond to, for example, a spring, and may be connected to the disk unit 101 and the upper side of the tactile feedback apparatus 100. That is, the disk restoring unit 103 may be disposed between the disk unit 101 and the driving unit 105 to maintain a gradient of the disk unit 101 formed according to the height at which the disk unit is supported, to remain within a predetermined range.

When the height at which the disk unit 101 is supported is lowered by the driving unit 105 and power used to support the disk unit 101 by the driving unit 105 is exhausted, the disk restoring unit 103 may adjust the gradient of the disk unit 101 to be the original gradient in accordance with a characteristic of the disk restoring unit 103, thereby restoring the gradient of the disk unit 101 to be in the original state. Here, the disk restoring unit 103 may be formed to be thin with a metal plate or an elastic material, for example, rubber, and may be formed in various patterns.

N driving units may be provided as the driving unit 105, and may be disposed below the disk unit 101 to support a lower portion of the disk unit 101. Here, N may be a natural number. For example, the N driving units may correspond to N pneumatic balloon driving units that may support the disk unit 101, using air pressure. In this instance, each of the N pneumatic balloon driving units may adjust a height at which the disk unit 101 is supported at each of N radially symmetric points designated, based on the center of the disk unit 101, by supporting the disk unit 101 using each respective air pressure, corresponding to an amount of air provided, for each of the N radially symmetric points.

The driving unit 105 may correspond to a motor driving unit to support the lower portion of the disk unit 101, using a drive shaft that moves in response to a pulse being applied. That is, the motor driving unit may adjust a height at which the disk unit 101 is supported, by moving the drive shaft upward and downward depending on a strength of a pulse applied. When N motor driving units may be provided as the driving unit 105, each of the N motor driving units may adjust a height at which the disk unit 101 is supported at each of the N radially symmetric points that are designated, based on the center of the disk unit, by moving the drive shaft depending on the strength of the pulse applied, for each of the N radially symmetric points. The motor driving unit may correspond to, for example, a magnetic driving device provided in a form of a solenoid.

The motor driving unit may include a triangular stand to convert a horizontal direction of a push strength that is formed in response to the pulse being applied into a vertical direction, and to transfer, to the drive shaft, the push strength of which the direction is converted to the vertical direction. That is, when the motor driving unit moves the triangular stand in a rightward and a leftward direction, i.e., in a horizontal direction depending on the strength of the pulse applied, the drive shaft connected to the triangular stand may move in an upward and a downward direction, i.e., in a vertical direction, and may support the lower portion of the disk unit 101.

In this case, the triangular stand may move the drive shaft in the upward and the downward direction by adjusting a portion in which an inclined plane comes into contacts with the drive shaft, depending on the applied push strength, thereby adjusting the height at which the disk unit 101 is supported. Each of the N driving motor driving units, including a triangular stand, may adjust a height at which the disk unit 101 is supported at each of N radially symmetric points that are designated, based on the center of the disk unit 101, by moving the drive shaft depending on the applied push strength, for each of the N radially symmetric points.

The control unit 107 may determine the height at which the disk unit 101 is supported, based on the signal generated by the sensor, using N driving units. When the N driving units correspond to N pneumatic balloon driving units, the control unit 107 may determine the height at which the disk unit 101 is supported by controlling, based on the signal generated by the sensor, an amount of air that is provided to each of the N pneumatic balloon driving units. When the N driving units correspond to N motor driving units, the control unit 107 may determine the height at which the disk unit 101 is supported, by controlling, based on the signal, a strength of a pulse that is applied to each of the N motor driving units.

When the N driving units correspond to N motor driving units, each including a triangular stand, the control unit 107 may determine, directly or through the triangular stand, based on the signal generated by the sensor, the height at which the disk unit 101 is supported, by controlling the applied push strength to each of the N motor driving units. That is, the control unit 107 may adjust a gradient or a height of the disk unit 101 by adjusting the height at which the disk unit 101 is supported by the N driving units.

The elastic member 109 may be included in the driving unit 105, and may be used as a buffer between the disk unit 101 and the driving unit 105. The elastic member 109 may control, according to a situation, an inflow of air into an air chamber included in the driving unit 105 or an outflow of air from the air chamber.

For example, in a situation in which compressed air flows into the air chamber included in a pneumatic balloon driving unit, the height at which the disk unit 101 is supported by the pneumatic balloon driving unit may be adjusted, by preventing the compressed air from flowing to the outside through a predetermined air vent. That is, the elastic member 109 may inflate depending on an amount of air that is provided by the pneumatic balloon driving unit, along with the air chamber disposed below the elastic member 109, thereby increasing the height at which the disk unit 101 is supported. In this instance, the elastic member 109 may restrict a maximum height at which the disk unit 101 is supported, by setting a permitted level of the inflation to be within a predetermined range.

Conversely, in a situation in which the compressed air is to be released from the air chamber, the elastic member 109 may open the air vent so that the air may flow out of the air chamber. In this instance, the elastic member 109 may restrain the disk unit 101 from being lowered below a predetermined height, along with the disk restoring unit 103.

The guide member 111 may be disposed around the disk unit 101, and may include a concave portion in which the finger of the user may be placed comfortably when touching the disk unit 101. That is, the guide member 111 may induce a natural contact of the finger to the disk unit 101, by including portions in a curved form, which fit on other parts of the finger, excluding the part touching the disk unit 101.

In addition, the guide member 111 may fix an angle or a height at which the finger of the user touches the disk unit 101, thereby restricting changes in the contact made to the disk unit 101, resulting from a movement of the finger. Accordingly, the guide member 111 may enable the user to sense a change in the disk unit 101 with a fixed part of the finger, for example, a fingertip, which is sensitive to a tactile sense.

The tactile feedback apparatus 100 may adjust a height, a direction of gradient, or a level of gradient of the disk unit 101 by adjusting the height at which the disk unit 101 is supported, based on a signal generated by a sensor, thereby intuitively recognizing power sensed by the sensor, with the finger of the user touching the disk unit 101. Accordingly, the tactile feedback apparatus 100 may be applied to a robot, for example, a surgical robot, that controls a sensitive tissue, for example, a human body, or an object. The tactile feedback apparatus 100 may transfer, to the user, power used to touch a tissue by an end part of the robot, and may enable the user to control power used to control the robot, in a sophisticated manner, based on the transferred power, thereby improving efficiency and safety in tasks that use robots.

Figure 2:
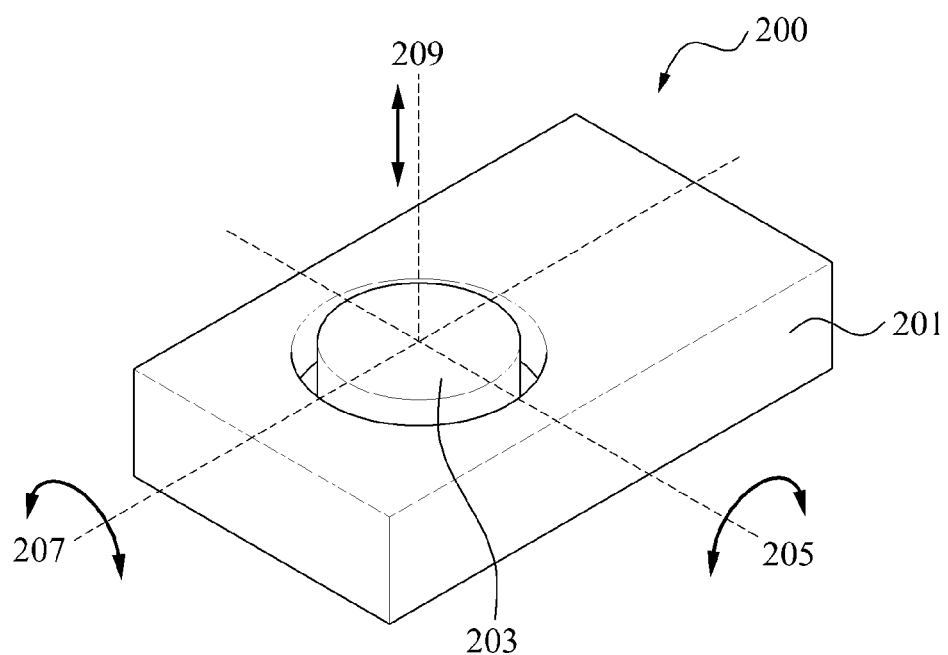
FIG. 2 illustrates a perspective view of a disk unit in a tactile feedback apparatus, according to example embodiments.

FIG. 2 illustrates a perspective view of a disk unit 203 in a tactile feedback apparatus 200, according to example embodiments.

Referring to FIG. 2, a tactile feedback apparatus 200 may include a disk unit 203, for example, provided in a form of a circular plate, on an upper side of a body 201, including a driving unit. Here, since the disk unit 203 may be rotatable in directions x and y within a predetermined range, based on first central axes 205 and 207, respectively, and may be movable in a direction x of a second central axis 209 within a predetermined range, and thus, a 3DOF motion may be provided. Accordingly, the disk unit 203 may be controlled at various angles through the 3DOF motion, and may transfer with ease, to a finger touching the disk unit 203, power corresponding to a sensed signal.

Figure 3:
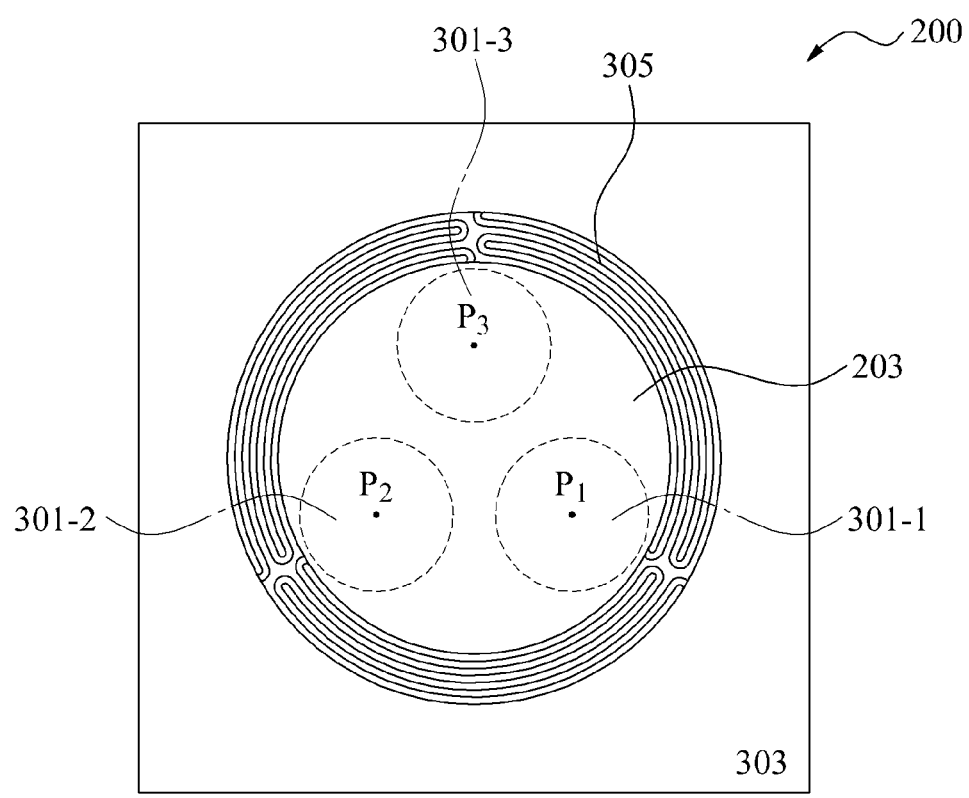
FIG. 3 illustrates a top view of a tactile feedback apparatus, according to example embodiments.

FIG. 3 illustrates a top view of a tactile feedback apparatus 200, according to example embodiments.

Referring to FIG. 3, a tactile feedback apparatus 200 may include three pneumatic balloon driving units 301-1, 301-2, and 301-3 that are disposed on a lower portion of a disk unit 203, for example, in a radially symmetric form. In this instance, each of the three pneumatic balloon driving units 301-1, 301-2, and 301-3 may adjust a height at which the disk unit 203 is supported at each of three radially symmetric points $p_1$, $p_2$, and $p_3$ that are designated based on the center of the disk unit, by supporting the disk unit 203 using each respective air pressure corresponding to an amount of air provided, for each of the three radially symmetric points $p_1$, $p_2$, and $p_3$.

Each of the three pneumatic balloon driving units 301-1, 301-2, and 301-3 may independently control the amount of air provided, and may separately adjust a level of pushing the disk unit 203 at each of the three radially symmetric points $p_1$, $p_2$, and $p_3$, thereby adjusting a strength of power and a direction in which a finger touching the disk unit 203 is stimulated.

The tactile feedback apparatus 200 may include a disk restoring unit 305 that is disposed between the disk unit 203 and an upper side 303 of a body. The disk restoring unit 305 may be connected between the disk unit 203 and the upper side 303 of the body, and may have a characteristic of restoring a gradient of the disk unit 203 to be in the original state.

Figure 4:
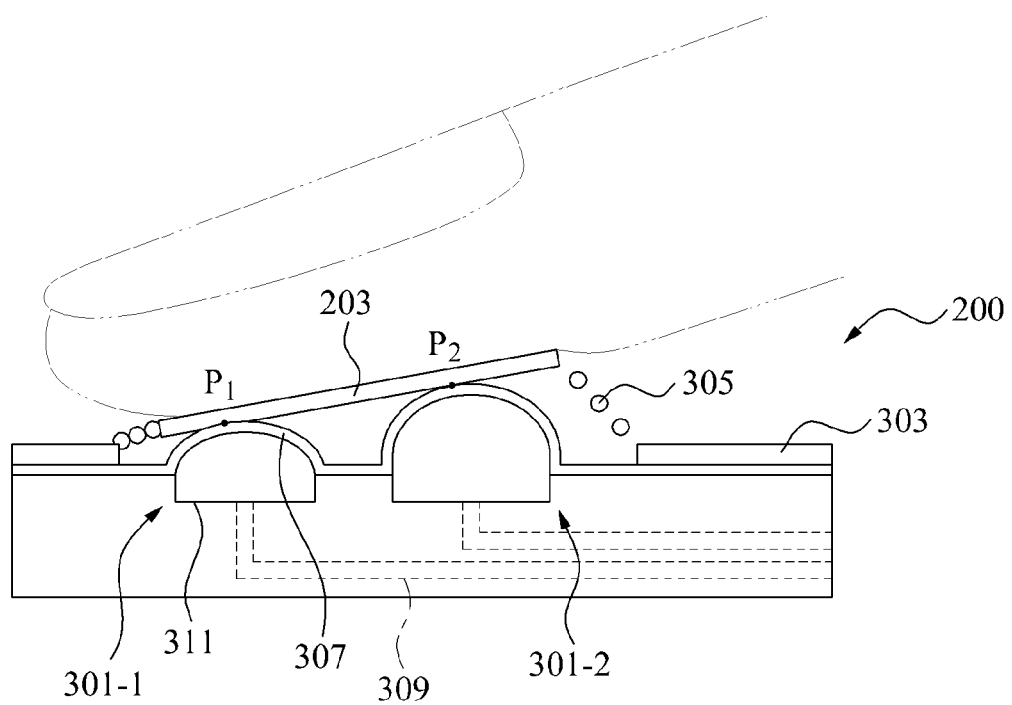
FIG. 4 illustrates a cross-sectional view of the tactile feedback apparatus of FIG. 3.

FIG. 4 illustrates a cross-sectional view of the tactile feedback apparatus 200 of FIG. 3.

Referring to FIG. 4, the tactile feedback apparatus 200 may include a disk unit 203, a disk restoring unit 305 to restore the inclined disk unit 203, and pneumatic balloon driving units 301-1 and 301-2 that support a lower portion of the disk unit 203. Each of the pneumatic balloon driving units 301-1 and 301-2 may include an air chamber 311, and an elastic member 307 that inflates in response to an inflow of air, and transfers power used to support the disk unit 203.

The disk unit 203 may transfer power sensed by a sensor to a finger of a user touching the disk unit 203, by adjusting a height, a direction of a gradient, or a level of a gradient, based on a height adjusted by each of the pneumatic balloon driving units 301-1 and 301-2, for each of radially symmetric points $p_1$ and $p_2$.

The first pneumatic balloon driving unit 301-1 may adjust a height at which the disk unit 203 is supported at the first radially symmetric point $p_1$, using air pressure corresponding to an amount of air provided to the first pneumatic balloon driving unit 301-1, and the second pneumatic balloon driving unit 301-2 may adjust a height at which the disk unit 203 is supported at the second radially symmetric point $p_2$, to be different from the height at which the disk unit 203 is supported at the first radially symmetric point $p_1$, using air pressure corresponding to an amount of air provided to the second pneumatic balloon driving unit 301-2. Accordingly, the disk unit 203 may be tilted at an angle corresponding to a signal generated by the sensor.

When compressed air is provided to the air chamber 311 through an air tube 309 that is connected to the outside, the elastic member 307 may inflate to push the disk unit 203 in an upward direction. In this instance, the elastic member 307 may prevent the disk unit 203 from being positioned beyond a predetermined range of a direction or an angle, by controlling a level of inflation.

The tactile feedback apparatus 200 may adjust the height at which the disk unit 203 is supported at the second radially symmetric point $p_2$ to be higher than the height at which the disk unit 203 is supported at the first radially symmetric point $p_1$, by controlling the amount of air provided to the second pneumatic balloon driving unit 301-2 to be relatively greater than the amount of air provided to the first pneumatic balloon driving unit 301-1, thereby tilting the disk unit 203 to the left side. In this instance, a gradient of the disk unit 203 may correspond to a level of difference between the heights at which the disk unit 203 is supported at the first and second radially symmetric points $p_1$ and $p_2$.

Figure 5:
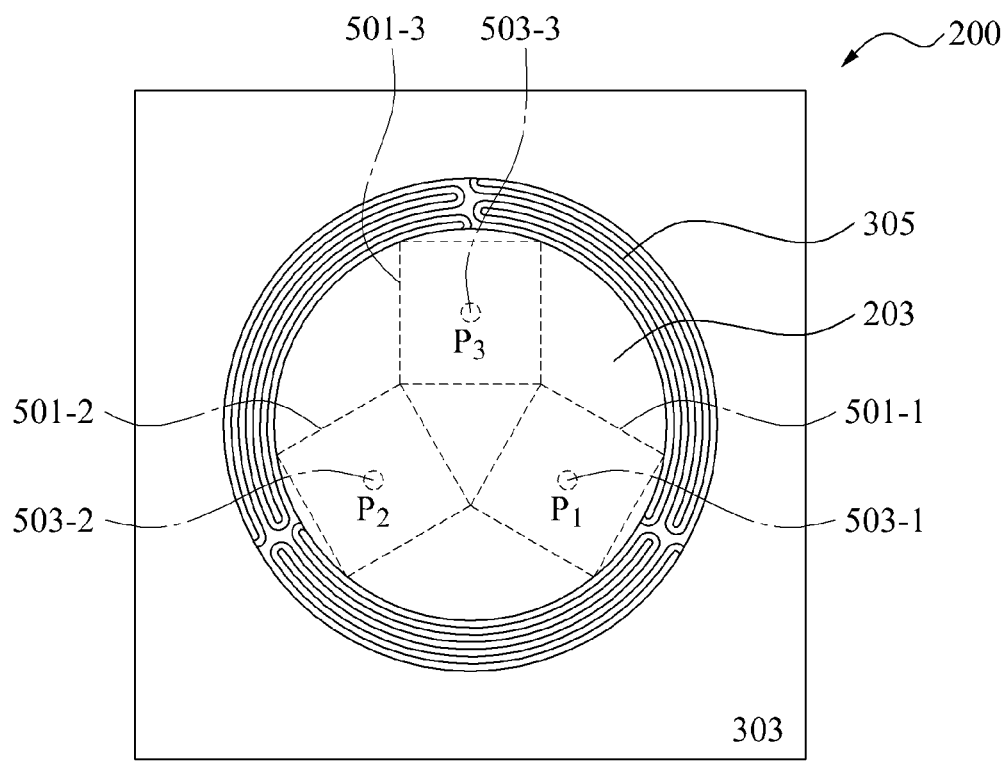
FIG. 5 illustrates a top view of a tactile feedback apparatus, according to other example embodiments.

FIG. 5 illustrates a top view of a tactile feedback apparatus 200, according to other example embodiments.

Referring to FIG. 5, a tactile feedback apparatus 200 may include three motor driving units 501-1, 501-2, and 501-3 that are disposed on a lower portion of a disk unit 203, for example, in a radially symmetric form. In this instance, each of the three motor driving units 501-1, 501-2, and 501-3 may adjust a height at which the disk unit 203 is supported at each of three radially symmetric points $p_1$, $p_2$, and $p_3$ that are designated based on the center of the disk unit 203, by moving each of drive shafts 503-1, 503-2, and 503-3 depending on a strength of a pulse being applied, for each of the three radially symmetric points $p_1$, $p_2$, and $p_3$. Each of the three motor driving units 501-1, 501-2, and 501-3 may independently control an amount of electric power provided, that is, the strength of the pulse provided, and may adjust a level of pushing the disk unit 203 at each of the three radially symmetric points $p_1$, $p_2$, and $p_3$ separately, thereby adjusting a strength of power and a direction in which a finger touching the disk unit 203 is stimulated.

The tactile feedback apparatus 200 may include a disk restoring unit 305 that is disposed between the disk unit 203 and an upper side 303 of a body. The disk restoring unit 305 may be connected between the disk unit 203 and the upper side 303 of the body, and may have a characteristic of restoring a gradient of the disk unit 203 to be in the original state.

Figure 6:
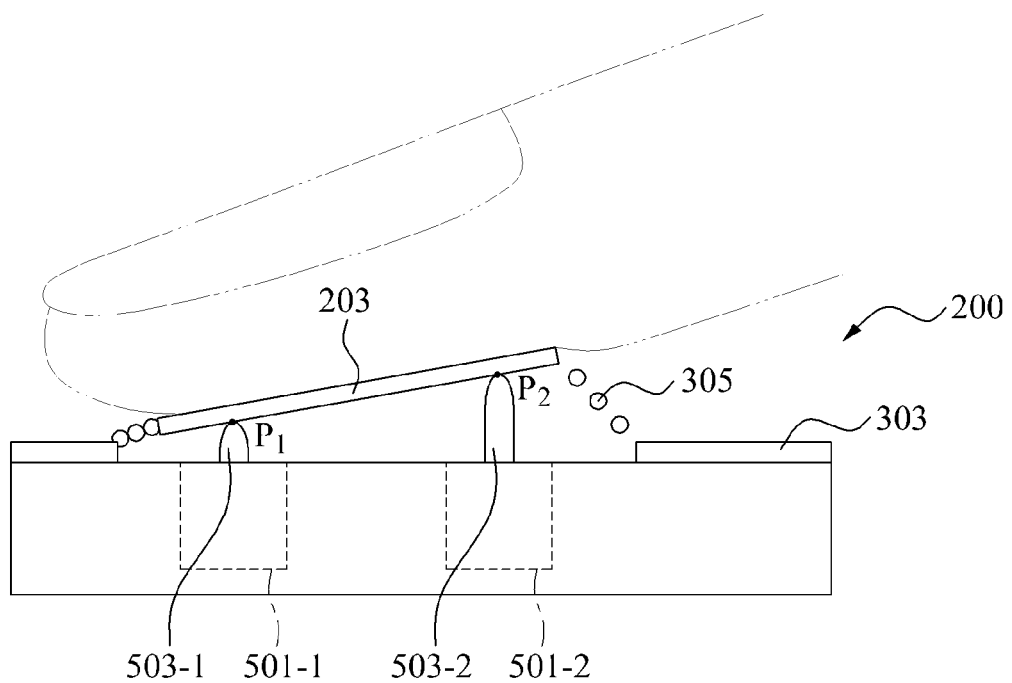
FIG. 6 illustrates a cross-sectional view of the tactile feedback apparatus of FIG. 5.

FIG. 6 illustrates a cross-sectional view of the tactile feedback apparatus of FIG. 5.

Referring to FIG. 6, the tactile feedback apparatus 200 may include a disk unit 203, a disk restoring unit 305 to restore the inclined disk unit 203, and motor driving units 501-1 and 501-2 that support a lower portion of the disk unit 203.

The disk unit 203 may transfer power sensed by a sensor to a finger of a user touching the disk unit 203, by adjusting a height, a direction of gradient, or a level of gradient, based on a height adjusted by each of the motor driving units 501-1 and 501-2, for each of radially symmetric points $p_1$ and $p_2$.

For example, the first motor driving unit 501-1 may adjust a height at which the disk unit 203 is supported at the first radially symmetric point $p_1$, by moving a drive shaft 503-1, depending on a strength of a pulse applied to the first motor driving unit 501-1, and the second motor driving unit 501-2 may adjust a height at which the disk unit 203 is supported at the second radially symmetric point $p_2$, to be different from the height at which the disk unit 203 is supported at the first radially symmetric point $p_1$, by moving a drive shaft 503-2 depending on a strength of a pulse applied to the second motor driving unit 501-2. Here, the motor driving units 501-1 and 501-2 may adjust the heights at which the disk unit 203 is supported, by directly moving the drive shafts 503-1 and 503-2 in an upward and a downward direction, respectively.

In FIG. 6, the tactile feedback apparatus 200 may adjust the height at which the disk unit 203 is supported at the second radially symmetric point $p_2$ to be higher than the height at which the disk unit 203 is supported at the first radially symmetric point $p_1$, by controlling a level of moving the drive shaft 503-2 depending on the strength of the pulse applied to the second motor driving unit 501-2 to be greater than a level of moving the drive shaft 503-1, depending on the pulse applied to the first motor driving unit 501-1, thereby tilting the disk unit 203 to the left side. In this instance, a gradient of the disk unit 203 may correspond to a level of difference between the heights at which the disk unit 203 is supported at the first and second radially symmetric points $p_1$ and $p_2$.

Figure 7:
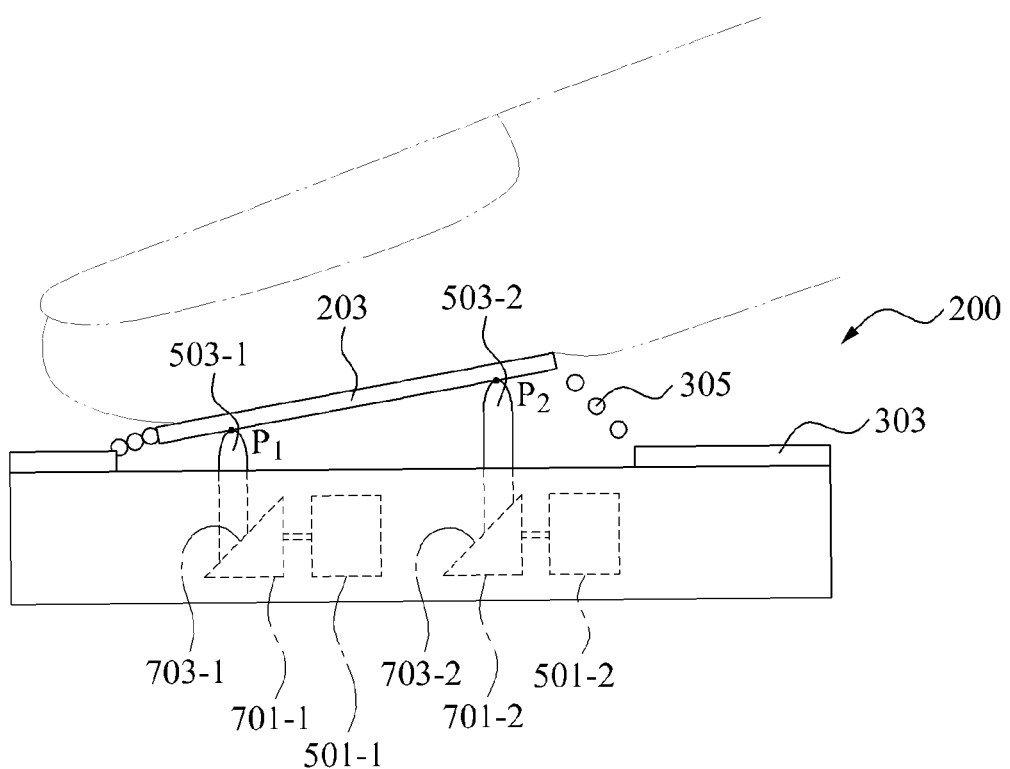
FIG. 7 illustrates another cross-sectional view of the tactile feedback apparatus of FIG. 5.

FIG. 7 illustrates another cross-sectional view of the tactile feedback apparatus of FIG. 5.

Referring to FIG. 7, the tactile feedback apparatus 200 may include motor driving units 501-1 and 501-2 as driving units, and a triangular stand 701-1 having an inclined plane 703-1, in the motor driving unit 501-1, and a triangular stand 701-2 having an inclined plane 703-2, in the motor driving unit 501-2.

In this case, the triangular stands 701-1 and 701-2 may move the drive shafts 503-1 and 503-2, respectively, in an upward and a downward direction to support a disk unit 203, using power of a vertical direction, generated by the motor driving units 501-1 and 501-2. That is, each of the triangular stands 701-1 and 701-2 may convert, into a vertical direction, a horizontal direction of a push strength that is formed in response to a pulse applied to each of the motor driving units 501-1 and 501-2, and may transfer, to each of the drive shafts 503-1 and 503-2, the push strength of which the direction is converted to the vertical direction. In order to achieve the foregoing, the triangular stands 701-1 and 701-2 may have the inclined planes 703-1 and 703-2, respectively, on which the drive shafts 503-1 and 503-2 move along the slopes in an upward and a downward direction, according to a horizontal movement resulting from the push.

For example, the first triangular stand 701-1 may adjust the height at which the disk unit 203 is supported at the first radially symmetric point $p_1$, using a vertical movement of the drive shaft 503-1, by moving the drive shaft 503-1 along the inclined plane 703-1 depending on a push strength of a horizontal direction formed by the first motor driving unit 501-1. Similarly, the second triangular stand 701-2 may adjust, using a vertical movement of the drive shaft 503-2, the height at which the disk unit 203 is supported at the second radio symmetry point $p_2$, to be different from the height at which the disk unit 203 is supported at the first radially symmetric point $p_1$, by moving the drive shaft 503-2 along the inclined plane 703-2 depending on a push strength of a horizontal direction formed by the second motor driving unit 501-2.

In FIG. 7, the tactile feedback apparatus 200 may adjust the height at which the disk unit 203 is supported at the second radially symmetric point $p_2$ to be higher than the height at which the disk unit 203 is supported at the first radially symmetric point $p_1$, by controlling a level of moving the drive shaft 503-2 in an upward and a downward direction through the second triangular stand 701-2 to be relatively greater than a level of moving the drive shaft 503-1 in an upward and a downward direction through the first triangular stand 701-1, thereby tilting the disk unit 203 to the left side. In this instance, a gradient of the disk unit 203 may correspond to a level of difference between the heights at which the disk unit 203 is supported at the first and second radially symmetric points $p_1$ and $p_2$.

Figure 8:
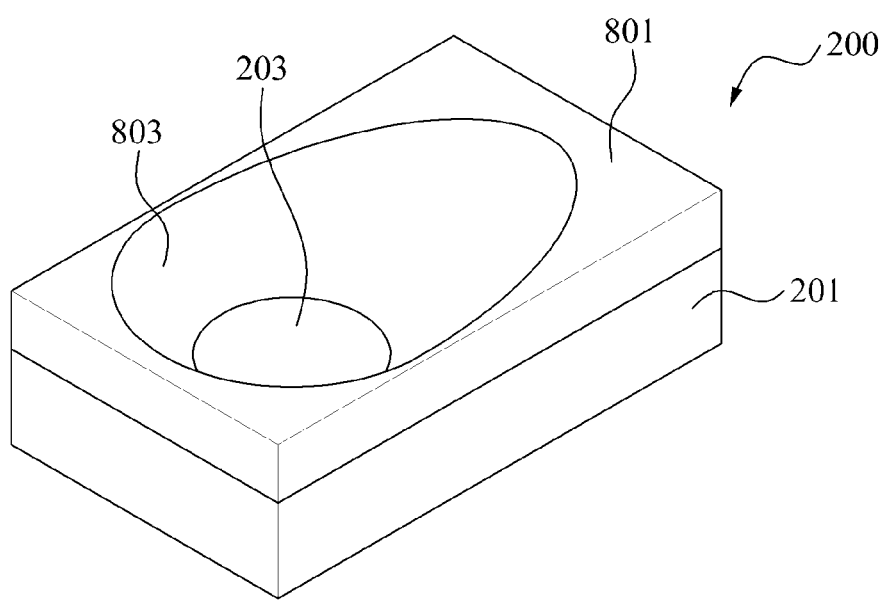
FIG. 8 illustrates a perspective view of a tactile feedback apparatus, according to other example embodiments.

FIG. 8 illustrates a perspective view of a tactile feedback apparatus, according to other example embodiments.

Referring to FIG. 8, a tactile feedback apparatus 200 may include a guide member 801 that is disposed on an upper portion of a body 201.

The guide member 801 may be disposed around a disk unit 203, and may include a concave portion 803 in which a finger of a user may be placed comfortably when touching the disk unit 203.

Figure 9:
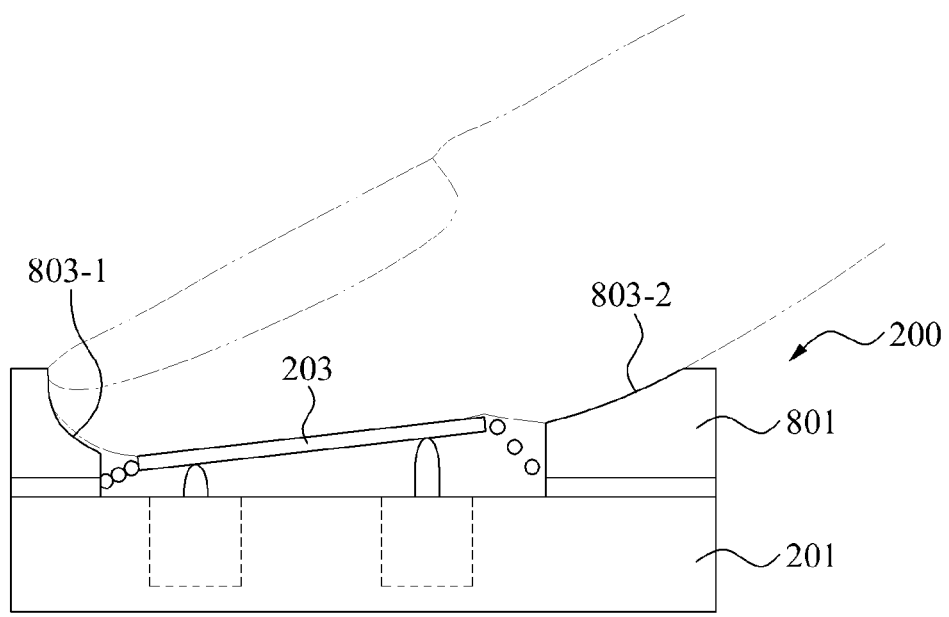
FIG. 9 illustrates a cross-sectional view of the tactile feedback apparatus of FIG. 8.

FIG. 9 illustrates a cross-sectional view of the tactile feedback apparatus of FIG. 8.

Referring to FIG. 9, the guide member 801 of the tactile feedback apparatus 200 may induce a natural contact of the finger to the disk unit 203, by including portions 803-1 and 803-2 in a curved form, which fit on other parts of the finger, excluding the part touching the disk unit 203.

The tactile feedback apparatus 200 may fix an angle or a height at which the finger of the user touches the disk unit 203, using the guide member 801, thereby restricting changes in contact made to the disk unit 203, resulting from a movement of the finger. Accordingly, the tactile feedback apparatus 200 may enable the user to sense a change in the disk unit 203 with a fixed part of the finger, for example, a fingertip which is sensitive to a tactile sense.

Figure 10:
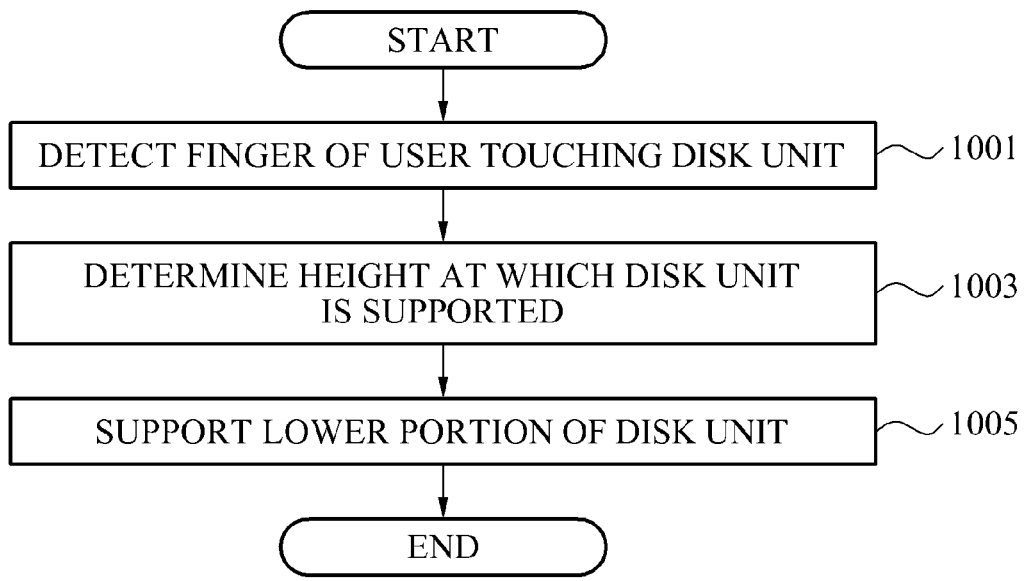
FIG. 10 illustrates a method of operating a tactile feedback apparatus, according to example embodiments.

FIG. 10 illustrates a method of operating a tactile feedback apparatus, according to example embodiments.

Referring to FIG. 10, in operation 1001, the tactile feedback apparatus may detect a finger of a user touching a disk unit. The disk unit, for example, provided in a form of a plate, may adjust a height, a direction of a gradient, or a level of a gradient by adjusting a height at which the disk unit is supported by a driving unit, at each radially symmetric point, thereby transferring power sensed by a sensor to the finger of the user. In this instance, since the disk unit may be movable or rotatable in directions x, y, and z; and thus, a 3DOF motion may be provided.

In operation 1003, the tactile feedback apparatus may determine the height at which the disk unit is supported, based on a signal generated by the sensor.

When the driving unit corresponds to a pneumatic balloon driving unit, the tactile feedback apparatus may determine the height at which the disk unit is supported by controlling, based on the signal, an amount of air that is provided to each of N pneumatic balloon driving units. In particular, the tactile feedback apparatus may designate N radially symmetric points based on the center of the disk unit, and may adjust a height at which the disk unit is supported at each of the N radially symmetric points, using each respective air pressure corresponding to the amount of air provided, for each of the N radially symmetric points.

When the driving unit corresponds to a motor driving unit, the tactile feedback apparatus may determine the height at which the disk unit is supported by controlling, based on the signal, a strength of a pulse that is applied to each of N motor driving units. In particular, the tactile feedback apparatus may designate N radially symmetric points based on the center of the disk unit, and may adjust a height at which the disk unit is supported at each of the N radially symmetric points by moving a drive shaft, depending on the strength of the pulse applied, for each of the N radially symmetric points.

In addition, the motor driving unit may include a triangular stand that converts a horizontal direction of a push strength that is formed in response to a pulse being applied into a vertical direction, and transfers, to the drive shaft, the push strength of which the direction is converted to the vertical direction. That is, the triangular stand may convert the horizontal direction of the power transferred from the motor driving unit into the vertical direction by moving the drive shaft along an inclined plane, and may transfer the power to the drive shaft, thereby determining the height at which the disk unit is supported by the drive shaft.

The tactile feedback apparatus may include an elastic member. In this instance, the tactile feedback apparatus may enable the elastic member to inflate depending on an amount of air that is provided by the pneumatic balloon driving unit, along with an air chamber disposed below the elastic member, thereby increasing the height at which the disk unit is supported. In this instance, the tactile feedback apparatus may restrict a maximum height at which the disk unit is supported, by permitting a level of the inflation of the elastic member within a predetermined range.

In operation 1005, the tactile feedback apparatus may support the lower portion of the disk unit by controlling N driving units to be set at the determined height.

The tactile feedback apparatus may fix an angle or a height at which the finger of the user touches the disk unit, using a guide member that is disposed around the disk unit. In this instance, the tactile feedback apparatus may employ the guide member, which may include a concave portion in which the finger of the user may be placed comfortably when touching the disk unit. That is, the tactile feedback unit may induce a natural contact of the finger to the disk unit, using the guide member including portions in a curved form, which fit on other parts of the finger, excluding the part touching the disk unit.

The tactile feedback apparatus may fix an angle or a height at which the finger of the user touches the disk unit, thereby restricting changes in contact made to the disk unit, resulting from a movement of the finger. Accordingly, the tactile feedback apparatus may enable the user to sense a change in the disk unit with a fixed part of the finger.

The tactile feedback apparatus may adjust a height, a direction of a gradient, or a level of a gradient of the disk unit by adjusting the height at which the disk unit is supported, based on a signal generated by a sensor, and may recognize power sensed by the sensor intuitively, with the finger of the user touching the disk unit.

The methods according to the above-described example embodiments may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the tactile feedback apparatus 200, as shown in FIG. 1, for example, may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A tactile feedback apparatus, the apparatus comprising:
   a disk unit that is touched by a finger of a user;
   N driving units individually driven to support a lower portion of the disk unit at radially symmetric points based on a center of the disk unit, wherein N is a natural number;
   a control unit configured to determine heights at which the N driving units support the disk unit, based on a signal generated by a sensor; and
   N motor driving units, each corresponding to one of the N driving units, wherein each of the N motor driving units moves its corresponding driving unit to the determined height using a drive shaft that moves in response to a pulse being applied to the motor driving unit,
   wherein the control unit controls, based on the signal, the strength of the pulse that is applied to each of the N motor driving units,
   wherein each of the N motor driving units includes a triangular stand to convert a horizontal direction of a push strength formed in response to the pulse being applied into a vertical direction, and to transfer, to the drive shaft, the push strength of which the direction is converted to the vertical direction,
   wherein the triangular stand includes an inclined plane and moves the drive shaft along the inclined plane depending on the push strength of the horizontal direction formed by a motor driving unit.

2. The apparatus of claim 1, wherein each of the N motor driving units adjusts the height at which the disk unit is supported at each of the N radially symmetric points that are designated, based on the center of the disk unit, by moving the drive shaft, depending on the strength of the pulse applied, for each of the N radially symmetric points.

3. The apparatus of claim 1, further comprising
   a disk restoring unit disposed at an outer part of the disk unit to maintain the gradient of the disk unit formed, according to the height at which the disk unit is supported, to remain within a predetermined range.

4. The apparatus of claim 1, further comprising
   a guide member to fix an angle or a height at which the finger touches the disk unit.

5. A method of operating a tactile feedback apparatus, the method comprising:
   detecting a finger of a user touching a disk unit;
   determining heights of N driving units that support the disk unit, based on a signal generated by a sensor, wherein N is a natural number;
   supporting a lower portion of the disk unit at radially symmetric points based on a center of disk unit by individually controlling the N driving units to be set at the determined heights; and
   controlling each of N motor driving units to move a corresponding one of the N driving units to the determined height using a drive shaft that moves in response to the strength of a pulse being applied to the motor driving unit,
   wherein the pulse strength is indicated by the sensor signal,
   wherein each of the N motor driving units includes a triangular stand to convert a horizontal direction of a push strength that is formed in response to the pulse being applied into a vertical direction, and to transfer, to the drive shaft, the push strength of which the direction is converted to the vertical direction,
   wherein the triangular stand includes an inclined plane and moves the drive shaft along the inclined plane depending on the push strength of the horizontal direction formed by a motor driving unit.

6. The method of claim 5, wherein the determining comprises:
   designating N radially symmetric points, based on the center of the disk unit; and
   adjusting a height at which the disk unit is supported at each of the N radially symmetric points by moving the drive shaft depending on the strength of the pulse applied, for each of the designated N radially symmetric points.

7. The method of claim 5, further comprising
   maintaining a gradient of the disk unit formed according to the heights at which a disk unit is supported using a disk restoring unit disposed at an outer part of the disk unit, to be within a predetermined range.

8. The method of claim 5, further comprising fixing an angle or a height at which the finger touches the disk unit.

9. A tactile feedback system, comprising:
   a tactile feedback apparatus comprising:
   a disk unit that is touched by a finger of a user,
   N driving units individually driven to support a lower portion of the disk unit at radially symmetric points based on a center of the disk unit, wherein N is a natural number, and
   N motor driving units, each corresponding to one of the N driving units;
   a control unit to determine heights at which the N driving units support the disk unit, based on a signal generated by a sensor; and
   a robot to which the tactile feedback apparatus is applied, wherein each of the N motor driving units moves its corresponding driving unit to the determined height using a drive shaft that moves in response to a pulse being applied to the motor driving unit,
   wherein the control unit controls, based on the signal, the strength of the pulse that is applied to each of the N motor driving units,
   wherein each of the N motor driving units includes a triangular stand to convert a horizontal direction of a push strength formed in response to the pulse being applied into a vertical direction, and to transfer, to the drive shaft, the push strength of which the direction is converted to the vertical direction,
   wherein the triangular stand includes an inclined plane and moves the drive shaft along the inclined plane depending on the push strength of the horizontal direction formed by a motor driving unit.

10. The system of claim 9, wherein each of the N motor driving units adjusts the height at which the disk unit is supported at each of the N radially symmetric points that are designated based on the center of the disk unit, by moving the drive shaft depending on the strength of the pulse applied, for each of the N radially symmetric points.

* * * * *